United States Patent [19]

Rigert

[11] 3,725,830
[45] Apr. 3, 1973

[54] CONTROL MEANS FOR RECLOSING CIRCUIT BREAKER
[75] Inventor: Max Rigert, West Allis, Wis.
[73] Assignee: McGraw-Edison Company, Elgin, Ill.
[22] Filed: Mar. 24, 1972
[21] Appl. No.: 237,732

[52] U.S. Cl. ....................335/32, 317/22, 317/59
[51] Int. Cl. ..............................H01h 81/04
[58] Field of Search..........335/26, 27, 28, 29, 30, 32, 335/33, 34; 317/36 TD, 18 R, 33 R, 22, 46, 59

[56] References Cited

UNITED STATES PATENTS

| | | | |
|---|---|---|---|
| 3,233,067 | 2/1966 | Rigert | 335/32 |
| 3,183,331 | 5/1965 | Barkan | 335/28 |
| 2,632,823 | 3/1953 | Oppel | 335/28 |
| 3,250,876 | 5/1966 | Schultz et al. | 335/29 |
| 3,309,571 | 3/1967 | Gilker | 317/22 |

Primary Examiner—Harold Broome
Attorney—Richard C. Ruppin

[57] ABSTRACT

A reclosing circuit breaker having a fault overcurrent time delay means and an operation counting means. The opening time delay means selectively permits one or more fast opening operations and then, in response to a pumping force by a spring charged during a previous opening operation, blocks an oil exhaust port so that subsequent opening operations are time delayed. The operation counting means is advanced a predetermined step distance for each opening operation of the circuit breaker and is held in each advanced step until just before reclosing of the circuit breaker. The step distance advanced and the point at which the counting means is released is controlled, in part, by a simple adjustment device. Depending on its initial setting, the counting means will permit a predetermined number of circuit breaker opening operations and then will actuate a means for locking open the circuit breaker.

12 Claims, 3 Drawing Figures

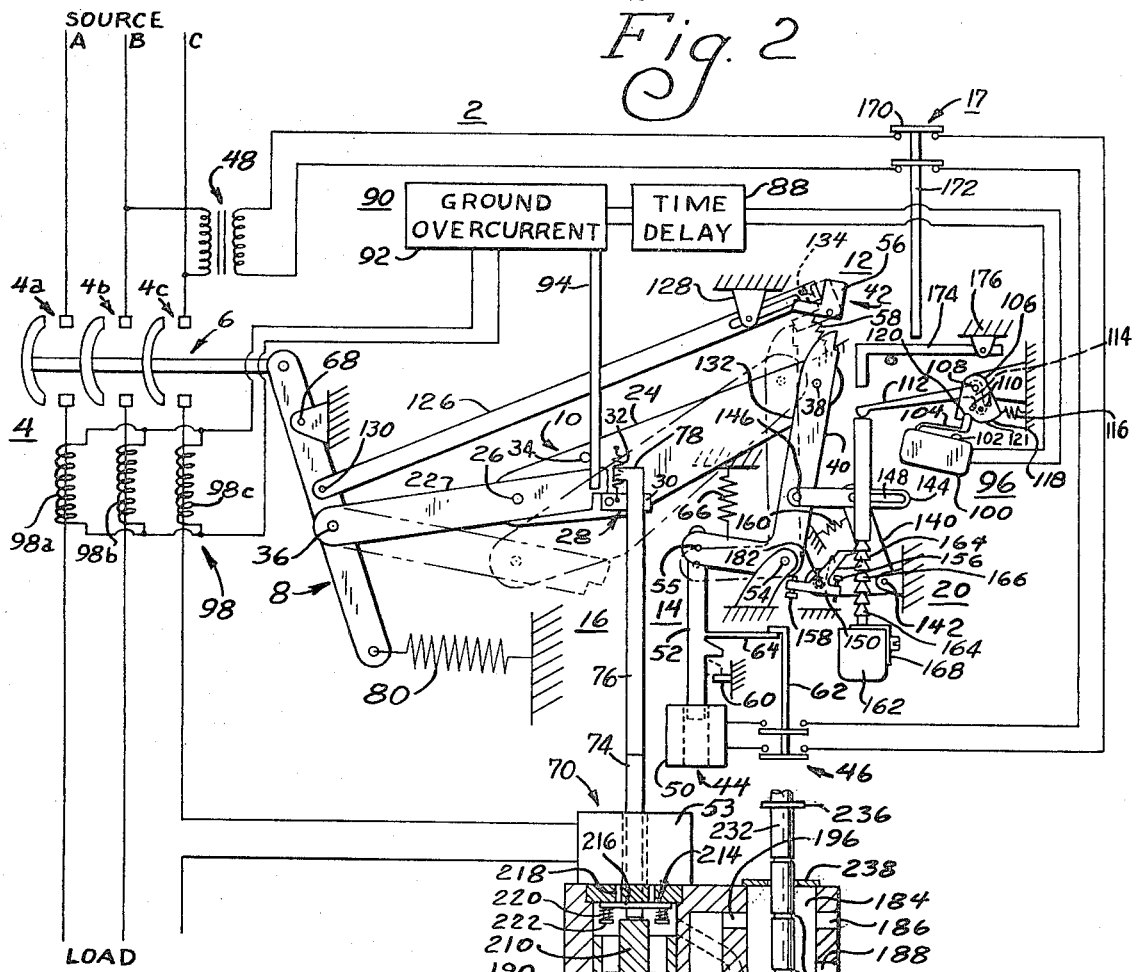
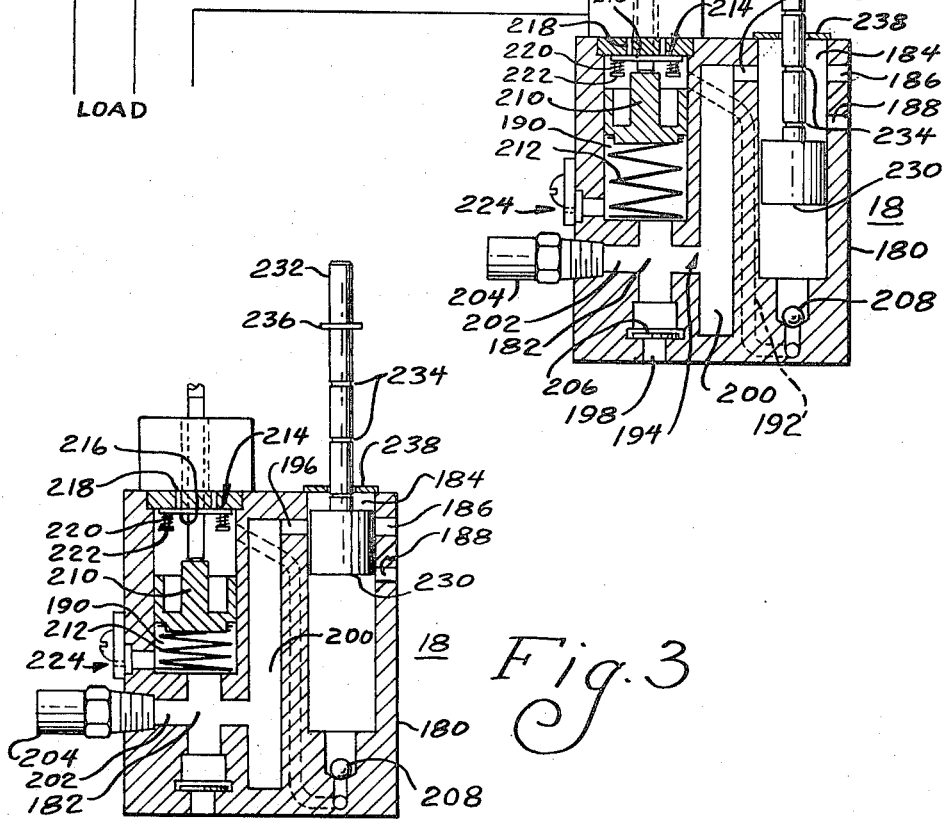

CONTROL MEANS FOR RECLOSING CIRCUIT BREAKER

BACKGROUND OF THE INVENTION

This invention relates to control means for reclosing type circuit breakers.

It is common practice in electrical power systems to coordinate a reclosing circuit breaker with other interrupting devices in the system so that all of the devices will operate cooperatively to isolate only a section of the system when a fault overcurrent occurs in that section. Thus, reclosing circuit breakers are operative to execute a series of successive opening and reclosing operations to permit a temporary fault overcurrent to clear or to permit a fault in a more remote section of the system to be isolated by devices adjacent that section. The last one or two opening operations of the circuit breaker are delayed to enable the interrupting devices that are closer to the faulted section of the system to open and isolate the fault overcurrent to thereby enable the reclosing circuit breaker to reclose and maintain service to the immediately adjacent section of the system. Also, reclosing circuit breakers typically include operation counting and lockout means for preventing reclosing of the circuit breaker after a predetermined number of reclosing and opening operations. The reclosing circuit breaker is set to lock open after the number of opening operations at which it is considered that the fault is permanent in the immediate section of the system which the reclosing circuit breaker is intended to protect. This overall mode of operation of the closing circuit breakers in electrical power systems is well known in the art and will not be discussed in further detail.

SUMMARY OF THE INVENTION

It is a general object of the invention to provide a reclosing circuit breaker having a simple and efficient opening time delay means and an operation counting means which is more accurate in counting each opening operation of the circuit breaker than prior art devices.

The objects of the invention are accomplished by providing a circuit breaker contact operating means having an opening time delay means which delays the opening of the circuit breaker contacts in response to pumping of oil by a spring and also having an operation counting means which holds the position to which it is advanced following each opening operation. When the circuit breaker opens, action of a solenoid plunger and pumping piston charges a spring which, subsequent to opening of the circuit breaker, acts to pump oil and thereby move a member to a position at which it blocks an oil exhaust port. The oil exhaust port affects the rate at which the solenoid plunger and trip rod move to trip open the circuit breaker during a subsequent opening operation. The operation counting means advances one predetermined step for each opening operation of the contact operating means and holds the position to which it is stepped for a substantial length of time while the circuit breaker contacts are open rather than starting to return to its initial position immediately after being advanced to its new position.

Other objects and advantages of the invention will in part be obvious and will in part appear hereinafter. For a fuller understanding of the nature and objects of the invention, reference should be made to the following detailed description taken in connection with the accompanying drawing.

BRIEF DESCRIPTION OF THE DRAWING

FIG. 2 shows the reclosing circuit breaker in an open condition following one opening operation; and FIG. 3 shows the opening time delay means of the reclosing circuit breaker in a blocking condition in which a subsequent opening operation of the circuit breaker will be delayed.

DESCRIPTION OF THE PREFERRED EMBODIMENT

Figure 1:
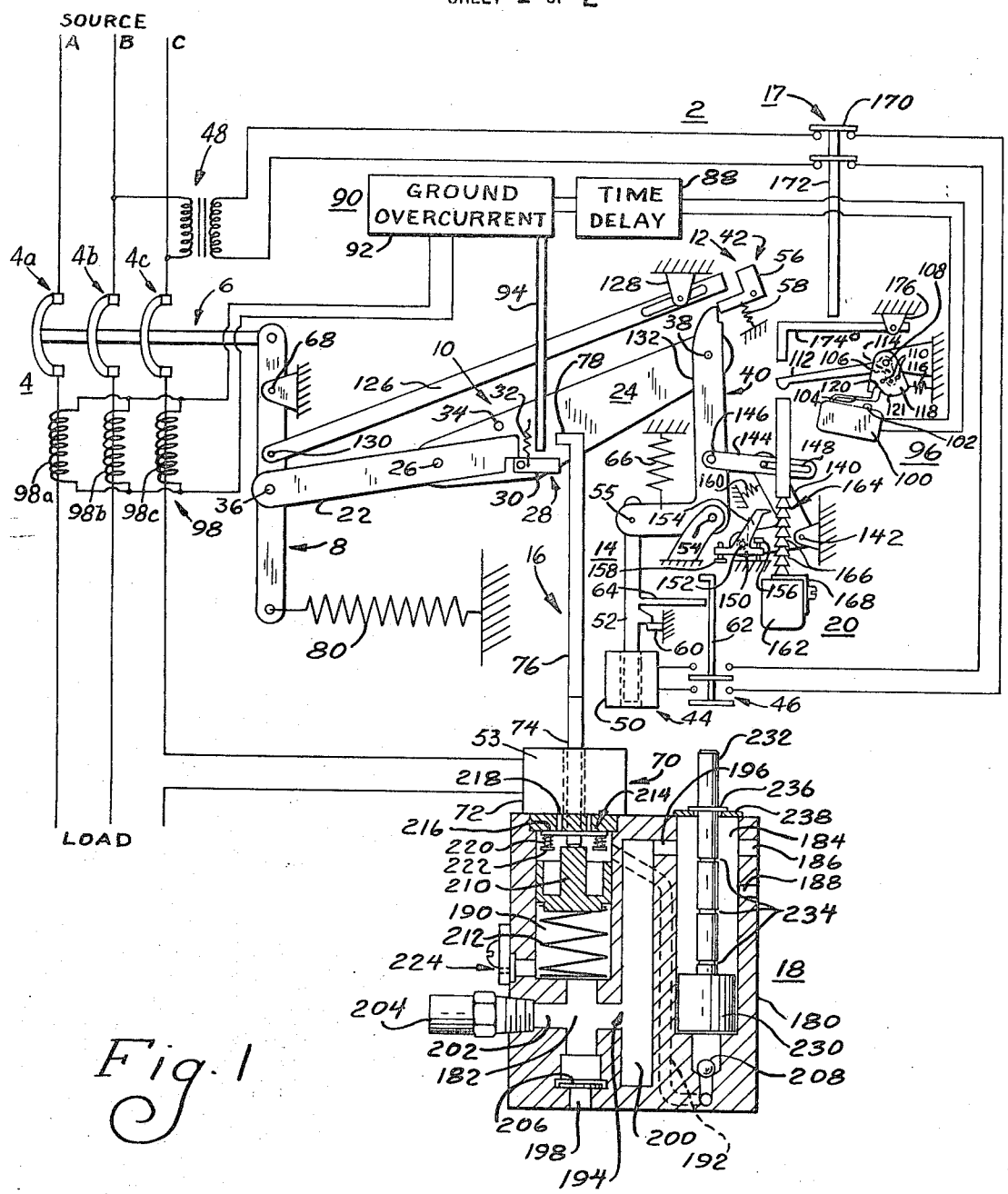
FIG. 1 show the reclosing circuit breaker in a closed condition.

Referring generally to the drawing, a reclosing circuit breaker is shown connected in a polyphase electrical power system having phases A, B, and C. The reclosing circuit breaker includes contact operating means 2 and contact means 4 connected in the phase lines A, B, and C. The contact means 4 preferably comprises three vacuum-type interrupters 4a, 4b, and 4c, respectively connected in series with the phase lines A, B, and C. The contact operating means 2 includes contact rod 6 for moving the contact means 4 to an open position as shown in FIG. 2 and a closed position as shown in FIG. 1, pivot lever means 8 for moving the contact rod 6 in opposite directions to open and close contact means 4. The contact operating means 2 also includes latchable toggle link means 10, reset means 12, closing actuation means 14, opening actuation means 16, opening time delay means 18 and operation counting means 20.

The contact operating means 2 has a first position shown in FIG. 1 corresponding to the closed position of the contact means 4 and a second position shown in FIG. 2 corresponding to the open position of the contact means 4. The latchable toggle link 10 includes a line 22, a link 24 pivoted to the link 22 at pivot point 26 and latch means 28 mounted on link 24. The latch means 28 includes a latch lever 30 and spring 32 holding the latch lever 30 in a latched position. The latch means 28 holds the toggle link means 10 in a substantially straight line position, when latched, as shown in FIG. 1 and in full lines in FIG. 2. The toggle link means 10 is prevented from collapsing in an upward direction relative to the view of FIG. 1 and 2 by a pin 34. The toggle link means 10 is pivotally attached at points 36 and 38 to the pivot lever means 8 and to a bell crank 40 which comprises part of the closing means 14.

As mentioned above, the closing actuation means 14 includes the bell crank 40 and also includes a spring 66 attached to the bell crank 40. The bell crank 40 is pivotally mounted at pivot point 41 and has a latched counterclockwise position shown in FIG. 1 corresponding to the closed position of contact means 4 and the first position of the contact operating means 2. The bell crank means 40 has an unlatched clockwise position shown in FIG. 2 corresponding to the open position of the contact means 4 and the second position of the contact operating means 2. The opening means 16 also includes voltage means 44 having a voltage coil 50, a voltage coil interrupting switch 46, and a potential transformer 48 having a secondary winding connected across two phases of the polyphase system and a secondary winding connected through the interrupting switch 46 to the voltage coil 50. The voltage means 44 also includes a plunger rod 52 pivotally attached to the bell crank 40 at point 54. The plunger rod 52 is movable in opposite vertical directions and has an upward position and a downward position as shown in FIG. 1 when the bell crank 40 is rotated to its counterclockwise position and maintained in the counterclockwise position as shown in FIG. 1 by latch means 42. The latch means 42 includes a latch lever 56 and a spring 58 biasing the latch lever 56 toward its latched position. The maximum downward position of the plunger rod 52 is set by the plunger stop 60 as shown in FIGS. 1 and 2. The switch means 46 has an arm 62 and the plunger rod 52 has an arm 64 which actuates the switch means 46 to a closed position when the plunger rod 52 moves in the direction of its upward position. When the plunger rod 52 is in its downward position, as shown in FIG. 1, the switch means 46 is open so that the voltage coil 50 is deenergized. When the voltage coil 50 is deenergized and the latch means 42 is unlatched, the spring 66 rotates the bell crank 40 to its clockwise position shown in lines in FIG. 2 and moves the plunger rod toward its upward position. When the plunger rod 52 moves to its upward position, it closes the switch means 46 to thereby cause energization of the voltage coil 50 and counterclockwise rotation of bell crank 40. Counterclockwise rotation of bell crank 40, in turn, causes movement to the left of the substantially rigid toggle link means 10 as shown in full lines in FIG. 2 and pivoting of pivot lever means 8 to move the contact means 2 to its closed position. The switch means 46 as shown in FIG. 2 is in a position just prior to being closed during upward movement of the plunger rod 52 in response to spring 66.

The opening actuation means 16 includes a solenoid 70 having a plunger 74 and a solenoid coil 52 connected in series with one of the phases C of the polyphase system. The opening means 14 also includes a trip rod 76 having a trip finger 78 attached to the plunger 74, and an opening spring 80. The opening means 16 further includes ground overcurrent means 90 having overcurrent sensing and tripping means 92, electronic time delay means 88, trip rod 94, time delay selecting means 96 and current transformer means 98. The current transformer means includes three parallel connected current transformers 98a, 98b, and 98c respectively coupled to phaselines A, B, and C and connected to the sensing and tripping actuation means 92. The time delay selecting means 96 includes a switch 100 having a stationary contact 102 and a movable contact arm 104 biased in an upward direction relative to the views of FIGS. 1 and 2. The time delay selecting means 96 also includes a selector plate 106 pivotally mounted at 108 and having selecting holes 110, an arm 112 having an end 114 selectively insertable in one of the holes 110 to thereby set the vertical position of arm 112 as shown in FIGS. 1 and 2, and a spring 116 holding the selector plate 106 in engagement with the contact arm 112. The selector plate 106 has a cam surface 118 including a high point 121 and an indentation 120 in which the contact 104 rests to thereby maintain the contact 104 disengaged from the stationary contact 102. The contact 104 is movable out of the indentation on to the high point 121 of the cam surface by rotation of the selector plate 106 as will be described hereinafter.

In general, the opening actuation means 16 operates in response to either a ground overcurrent or a phase overcurrent. In the case of a phase overcurrent, the solenoid coil 72 is energized sufficiently so that trip finger 89 releases latch lever 30. The toggle link means 10 will then collapse in a downward direction to the position shown in phantom lines in FIG. 2 in response to the force of opening spring 80. The collapse of the toggle link means 10 also permits the opening spring 80 to pivot lever means 8 in a counterclockwise direction about pivot point 68 to thereby move the contact means 4 to its open position and interrupt the flow of the current to the solenoid coil 72. Ground overcurrent will be sensed by the current transformer means 98 and the sensing and tripping actuation means 92 to thereby move the tip rod 94 downward to engage and pivot the latch lever 30. Similarly to the phase overcurrent, the toggle link means 10 then collapses and the contact means 4 opens in response to the action of opening spring 80 on pivot lever means 8. The sensing and tripping actuation means 92 is of a type well known in the art and therefore will not be described in further detail.

The reset means 12 includes a latch trip member 126 slidably mounted on support 128 and pivotally connected to the pivot lever means 8 at point 130. Insofar as they are utilized to reset or relatch the toggle link means 10, the arm 132 of bell crank 40, the latch means 42 and the spring 66 also comprise part of the reset means 12. In the view of FIG. 1, the bell crank 40 is in its counterclockwise position, the toggle link means 10 is in a substantially rigid condition and the latch trip member 126 is spaced from the latch means 42. In the phantom view of FIG. 2, the toggle link means 10 is collapsed, the arm 132 of bell crank 40 is still in its counterclockwise position and is held in that position by latch means 42. However, due to the pivoting of pivot lever 8, the latch trip member 126 has moved toward but not yet engaged the latch means 42 as indicated by the phantom end line 134 of the latch trip member 126. When the pivot lever means 8 reaches its position shown in FIG. 2, the latch trip member 126 and latch means 42 will have their full line position shown in FIG. 2 in which the latch trip member 126 is engaged with and unlatched the latch means 42. Upon unlatching of latch means 42, the arm 132 of bell crank 40 is moved clockwise under the force of spring 66 so that the toggle link means 10 is straightened out and thereby reset in its latched condition. The toggle link means 10 is now in condition for initiation of a reclosing operation by closing actuation means 14.

The operation counting means 20 includes a bell crank 140 pivotally mounted at pivot point 142 and link 144 pivotally connected to bell crank 40 at pivot point 146 and slidably connected to bell crank 140 at lost motion slot 148. The operation counting means 20 also includes pawl means 150 pivotally mounted at pivot point 152 on bell crank 140, oil-filled dashpot 162 and a ratchet rod 164 having serations 166 and being vertically movable in and out of dashpot 162. The pawl means 150 includes a spring 154 urging the pawl clockwise into engagement with the serations 166 of ratchet rod 164, a screw 156 setting the distance of the pawl means 150 from the ratchet rod 164 when the bell crank 140 is in its counterclockwise position shown in FIG. 1, and a screw 158 engaging a cam surface of the bell crank 140 as shown in FIG. 2 and setting the release point of the pawl means 150 from the ratchet rod 164 when the bell crank 140 moves toward its clockwise position shown in FIG. 2. In operation, the counting means 20 is responsive to clockwise rotation of the bell crank 40. When the bell crank 40 is in its counterclockwise position shown in FIG. 1 and the contact means 4 is closed, the bell crank 140 of counting means 20 is held in a counterclockwise position by spring 160. The pawl means 150 is relatively downward and held away from ratchet rod 164 by screw 156. When the contact means 4 is open and the bell crank 40 rotates to its clockwise position shown in FIG. 2, the bell crank 140 is rotated to a clockwise position by line 144 and the pawl means 150 is thereby moved upward so that screw 156 is no longer effective and spring 154 moves the pawl means 150 into engagement with one of the serations 166 of ratchet rod 164. During clockwise rotation of bell crank 140 the pawl means 150 will move the ratchet rod 164 upward out of the dashpot 162 a distance determined by the setting of screw 158. The screw 158 engages the bell crank 40 to release the pawl 150 from ratchet rod 164 after the desired upward travel has taken place. A particular advantage of this construction is that the pawl means 150 will hold the ratchet rod 164 upward at the desired position until just prior to initiation of reclosing of the contact means 4 by the closing actuation means 14. In prior art devices, this holding is not obtained and the counting means will start to move back to its initial condition immediately after being moved the predetermined count distance. When the closing actuation means 14 recloses the contact means 4, the link 144 moves generally in a counterclockwise direction with bell crank 40 thereby permitting spring 160 to return the bell crank 140 to its counterclockwise position. The purpose of the lost motion slot 148 is to minimize mechanical wear on bell crank 140 by eliminating direct movement of bell crank 140 with bell crank 40 which moves rapidly and with a considerable force. An adjustment means 168 for setting the initial height of the ratchet rod 164 is also provided.

The lock out means 17 includes double pole switch means 170 having an opening rod 172 and a trip arm 174 pivotally mounted at 176 and engageable by the ratchet rod 164 after the latter has moved upward a predetermined distance comprising the accumulated count distances caused by operation of the opening actuation means 16 and rotation of the bell crank 40 to its clockwise position. Also depending on the initial vertical position of the ratchet rod 164 and the setting of the arm 112 of time delay selecting means 96, upward movement of the ratchet rod 164 will engage the arm 112 and rotate the selecting plate 106 so that the movable contact 104 will move out of the indentation 120 and on to the high point 121 of the cam surface 118 to thereby cause engagement of contacts 102 and 104. Engagement of contacts 102 and 104 causes a change in the ground overcurrent time delay means 88 so that a greater time delay occurs before the trip rod 94 causes opening of the contact means 4. The operation of the time delay selecting means 96, of course, is significant only if the operation of the contact operating means 2 is caused by a ground overcurrent. The internal operation of the time delay means 88 is well known in the art and therefore will not be discussed in detail herein.

The opening time delay means 18 is operative to provide a time delay in the opening of the contact means 4 when a phase overcurrent occurs. The opening time delay means 18 includes a container 180 containing a fluid such as oil 182 and including a first chamber 184 having exhaust ports 186 and 188 and a second chamber 190 connected to chamber 184 through a passage 192 and passage means 194. Passage means 194 includes opening 196, oil intake opening 198, a vertical passageway 200, and an oil vent passage 202. Timing orifice means 224 having an adjustable opening size also permits escape of oil 182 from the bottom of chamber 190. The vent passage 202 exhausts to the exterior of the container 180 through a valve 204 which opens only in response to high overcurrent actuation of solenoid plunger 74 and therefore high oil pressure in the bottom of chamber 190 and in passage means 194. The operation of timing orifice means 224 and valve 204 is well known and will not be discussed in detail. A disc valve 206 normally blocks the oil intake opening 198 and a ball valve 208 normally blocks the passage 192 adjacent its opening into a chamber 184. The chamber 190 contains a pumping piston 210 slidable in opposite vertical directions within the chamber 190 and engaging the lower end of the solenoid plunger 74 in the upward position of the piston 210 as shown in FIG. 1. A spring 212 is positioned in the lower end of the chamber 190 and bears against the bottom side of the piston 210 to bias it and the solenoid plunger 74 and therefore the trip rod 76 in their upward positions when the solenoid coil 72 is not energized sufficiently to pull plunger 74 downward. When the solenoid coil 72 is energized by an overcurrent, the solenoid plunger 74 pushes the piston 210 downwardly to thereby compress and charge the spring 212 and pump oil 182 through the passage means 194. Valve means 214 is positioned at the upper end of the chamber 190 and includes a disc valve 216, oil inlet passages 218, springs 220 and pins 222 anchored in the walls of container 180. The disc valve 216 is slidable on the pins 222 and is biased upwardly by the springs 220 to close the oil inlet passages 218 when the piston 210 is in its upward position. When the piston 210 moves downward, the oil pressure exteriorly of the valve means 214 is greater than the pressure within the chamber 190 so that oil forces the disc valve 216 down and enters the upper part of chamber 190 through the oil inlet passages 218.

In the first chamber 184, a sequence piston 230 is slidable in opposite vertical directions. A stem 232 is affixed to the sequence piston 230 and extends vertically out of the chamber 184. The stem 232 has a series of spaced notches 234. An E-ring is snapped into the uppermost notch 234 and bearing against a plate 238 at the upper end of chamber 184 to close the chamber and also hold the sequence piston 230 in a vertical position within chamber 184 dependent on the notch 234 in which the E-ring 236 is fastened. When the solenoid plunger 74 and piston 210 move downwardly, the spring 212 is charged. As previously stated, downward movement of the solenoid plunger 74 moves trip rod 76 downward to result in opening of the contact means 4 so that the solenoid coil 72 is deenergized. This frees the solenoid plunger 74 and the piston 210 to be moved upward by the previously compressed spring 212. The piston 210 thereby pumps oil through the passage 192 against ball valve 208 which moves upward to permit the oil to flow into chamber 184 against the sequence piston 230 to move the sequence piston 230 a distance determined by the volume of oil pumped underneath the piston. Also, when the piston 210 moves upwardly, the pressure within chamber 190 beneath piston 210 becomes less than that exteriorly of the container 180 so that oil bearing against the disc valve 206 holds the disc valve 206 upwardly to result in flow of oil into the chamber 190 and passage means 194.

The overall operation of the opening time delay means 18 may be described with reference to FIGS. 1, 2, and 3. In FIG. 1, there is no phase overcurrent energizing solenoid coil 72 and therefore solenoid plunger 74 and the pumping piston 210 are in an upward position. The sequence piston 230 is in its lowest set position as determined by the notch to which the E-ring 236 is affixed. Upon occurrence of the phase overcurrent, the pump piston 210 is moved downwardly, the contact means 4 opens and the charged spring 212 moves the piston 210 upwardly to thereby pump oil 182 through the passage 192 and underneath the sequence piston 230. The piston 230 then moves from an exhaust port open position upwardly a predetermined distance to another exhaust port open position. Since the sequence piston 230 has not yet reached an exhaust port blocked position in which the exhaust port 186 and opening 196 are blocked, the downward movement of the solenoid plunger 74, the trip rod 76 and the piston 210 was relatively unimpeded during the previous opening operations. Therefore, the tripping of the latch means 28 and opening of contact means 4 occurred quickly after energization of solenoid coil 72 by the overcurrent. Assuming the phase overcurrent condition continues to be present after the initial opening and closing operation of the reclosing circuit breaker and the lockout means 17 does not operate, at least one more relatively fast downward pumping operation by piston 210 and upward pumping operation by the same piston in response to spring 212 to advance sequence piston 230 one more step will occur. However, on the last upward advancement of the sequence piston 230, it moves to a blocked position in which the exhaust port 186 is blocked and will not permit passage of oil from the chamber 184. In the blocked position of the sequence piston 230, however, the exhaust port 188 is partially open so that subsequent upward movement of piston 210 can occur due to flow of oil above piston 210 through passage 192 and ultimately out of port 188. If the phase overcurrent condition continues to exist the next downward movement of the solenoid plunger 74 and piston 210 will be retarded since only timing orifice means 224 and valve 204 are available to permit escape of oil 184 from beneath piston 210. This consequently delays tripping of latch means 28 and opening of contact means 4. During the open operations of the circuit breaker, the operation counting means 20 has been operating. Accordingly, if the counting means has been set by adjustment means 168 to move the lockout trip arm 174 upward into engagement with opening rod 172, after four openings, the switch means 170 will open and the circuit breaker will be prevented from again closing.

It may be noted at this point that in the event that the phase overcurrent condition ceases prior to lockout of the closing circuit breaker, the contact means 4 will remain closed, the solenoid 70 will not operate, and the sequence piston 230 will settle back down to its initial position as oil 182 escapes from the bottom of chamber 184 around the sequence piston 180 and out the ports 186 and 188. Also, if the overcurrent ceases before lockout occurs, the ratchet rod 164 will settle back down into dashpot 162 to its initial position.

While only a single specific embodiment of the invention has been shown herein, it will be realized that many modifications thereof are feasible without departing from the spirit and scope of the invention. It is accordingly intended that the scope of the invention is not to be limited to the specific embodiment disclosed.

I claim:

1. In a reclosing circuit breaker including contact means having an open and closed position and being connected in an electrical power system, the combination comprising:

contact operating means having first and second positions respectively corresponding to the closed and open positions of the contact means and including:

closing means connected to said system for actuating the contact operating means to close the contact means and moving the contact operating means from said second position to said first position;

opening means connected to said system for actuating the contact operating means to close the contact means and moving the contact operating means from said first position to said second position; and operation counting means having a plurality of positions and being sequentially advanceable to a different one of said positions in response to the contact operating means during each movement of the latter from said first to said second position for counting the number of opening operations of said contact means, said operation counting means being stationary in one of said positions subsequent to advancement thereto in response to said contact operating means.

2. The combination according to claim 1 wherein said operation counting means is stationary in each of said positions in response to the closing means.

3. The combination according to claim 1 wherein said operation counting means is releasable from each one of said positions at a selectively predetermined point in the movement of the contact operating means.

4. The combination according to claim 3 wherein said operation counting means has an initial position, a final position and is effective to prevent operation of said closing means when in said final position.

5. The combination according to claim 4 wherein said operation counting means comprises an elongated ratchet member and a pawl movable into engagement with the ratchet member, said ratchet member and pawl being movable in a direction together substantially parallel to the length of the ratchet member, said pawl being disengagable from said ratchet member at each one of said positions, the movement of said pawl and ratchet member together and the disengagement of the pawl from the ratchet member being in response to the closing means.

6. The combination according to claim 1 further comprising time delay means for delaying opening actuation of the contact means, said time delay means including a container having first and second connected chambers, fluid in said container, a fluid exhaust port in said first chamber, a movable member in said first chamber and having an exhaust port open position and an exhaust port blocked position, spring means responsive to said opening means for providing force to pump fluid against said movable member to move the latter from the exhaust port open position to the exhaust port blocked position, and piston means movable in said second chamber and having a retarded movement condition when the exhaust port is blocked for delaying operation of the opening means whereby opening of the contact means is also delayed.

7. In a reclosing circuit breaker including contact means having an open and closed position and being connected in an electrical power system, the combination comprising:

contact operating means for closing and opening the contact means, said contact operating means including:

closing actuating means connected to said system for actuating the contact operating means to close the contact means;

opening actuating means connected to said system and movable between a first position to a second position for actuating the contact operating means to open the contact means; and time delay means for delaying opening actuation of the contact operating means, said delay means including a container having first and second connected chambers, fluid in said container, a fluid exhaust port in said first chamber, a movable member in said first chamber and having an exhaust port open position and an exhaust port blocked position, spring means responsive to said opening actuating means for providing force to pump fluid against said movable member to move the latter from the exhaust port open position to the exhaust port blocked position, and piston means movable in said second chamber and having a retarded movement condition when the exhaust port is blocked for delaying operation of the opening actuation means whereby opening of the contact means is also delayed.

8. The combination according to claim 7 wherein: said spring means is in said second chamber and has a charged condition, said springs being moved to the charged condition in response to movement of the opening actuation means from its first to its second position; and said piston means is movable in response to movement of the opening actuation means from its first to its second position to pump fluid out of said exhaust port when the latter is open, said piston means having a non-retarded movement condition when the exhaust port is open whereby opening the contact means is relatively non-delayed following operation of the opening actuation means.

9. The combination according to claim 7 wherein said piston means is movable in a first direction in response to movement of the opening actuation means to pump fluid out of said container and is movable in an opposite direction in response to said spring means to pump fluid against said movable member in the first chamber.

10. The combination according to claim 9 wherein:

said container includes a first passage connecting opposite ends of the first and second chambers and a second passage connecting the other opposite ends of the first and second chambers;

movement of the piston means in its first direction pumps fluid through the first passage, and out of the container through the exhaust port when the movable member is in its exhaust port open position, pumping of fluid by the piston means through the first passage and exhaust port being blocked when the movable member is in its exhaust port blocked condition; and movement of the piston means in its opposite direction pumps fluid through the second passage against the movable member to move the latter toward its exhaust port blocked position.

11. The combination according to claim 7 further comprising:

operation counting means for counting the number of opening operations of said contact means; and wherein said opening actuation means includes:

electronic time delay means responsive to a ground overcurrent in said system for delaying opening actuation of the contact operating means, said electronic time delay means having an initial condition in which no time delay is provided and a time delay condition; and time delay selecting means responsive to said operation counting means to modify the electronic time delay means from its initial to its time delay condition.

12. The combination according to claim 11 wherein;

said contact operating means has first and second positions respectively corresponding to the closed and open positions of the contact means;

said operation counting means has a plurality of positions and is sequentially advanceable to a different one of said positions in response to the contact operating means during each movement of the latter from said first to said second position; and said time delay selecting means comprises switch means having a stationary contact and a movable contact finger having disengaged and engaged positions for modifying said electronic time delay means when the stationary contact and movable contact finger are in their engaged position, selector means having a cam surface including a high point and an indentation and normally engaging the contact finger at said indentation for moving the contact finger from said disengaged to said engaged position, spring means for maintaining the selector means in engagement with the contact finger, arms means positioned for engagement with said operation counting means as the latter advances, said arm means being selectively positionable on the selector means whereby the position at which the operation counting means engages the arm means may be determined, said arm means being effective in response to movement of the operation counting means to a position at which the movable contact finger of the switch means engages the high point of said cam surface and is in the engaged position with the stationary contact whereby the electronic time delay means is modified from its initial condition to its time delay condition.

* * * * *